United States Patent [19]

Beneck et al.

[11] Patent Number: 4,944,911

[45] Date of Patent: Jul. 31, 1990

[54] NUCLEAR FUEL ASSEMBLY STRUCTURE COMPACTING DEVICE

[75] Inventors: Jean A. Beneck, Ormesson; Guayre Claude, Neuilly Plaisance, both of France

[73] Assignee: Framatome, Courbevoie, France

[21] Appl. No.: 362,995

[22] Filed: Jun. 8, 1989

[30] Foreign Application Priority Data

Jun. 10, 1988 [FR] France .................. 88 07795

[51] Int. Cl.$^5$ .............................................. G21F 9/36
[52] U.S. Cl. .................................... 376/261; 100/215; 100/218; 100/229 R
[58] Field of Search ................. 376/260, 261; 252/626, 252/633; 100/215, 218, 229 R

[56] References Cited

U.S. PATENT DOCUMENTS

| | | | |
|---|---|---|---|
| 4,006,679 | 2/1977 | Egosi | 100/215 |
| 4,511,499 | 4/1985 | Meuschke et al. | 376/261 |
| 4,537,711 | 8/1985 | Wilhelm et al. | 376/260 |
| 4,648,989 | 3/1987 | Klein | 376/261 |

Primary Examiner—Daniel D. Wasil
Attorney, Agent, or Firm—Pollock, Vande Sande & Priddy

[57] ABSTRACT

A device for compacting a nuclear fuel assembly structure comprises a vertical compacting chamber having a cross-section matching that of the structure, structure guiding means and a jack for longitudinally compressing the structure against a movable member closing one end of the chamber. The compacting chamber is of sufficient length for receiving a non-fractionated structure and is provided, at the end opposite the compacting jack, with a unit movable transversely to the chamber between a position making possible the introduction of a structure and a position in which a reception box equipped with an ejection jack and forming the removable member is aligned with the compacting chamber.

9 Claims, 3 Drawing Sheets

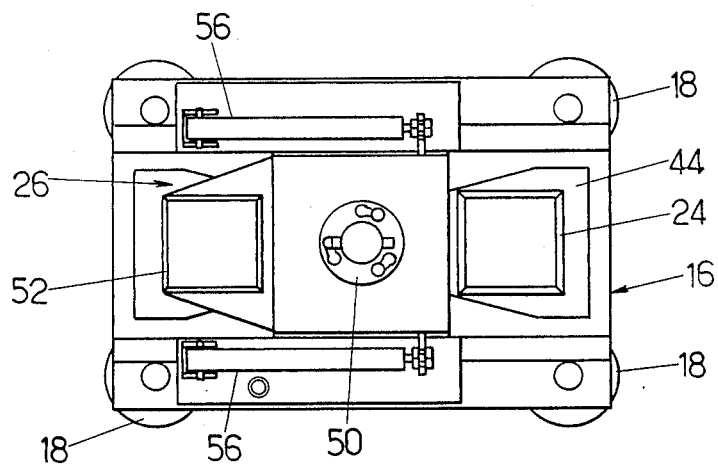
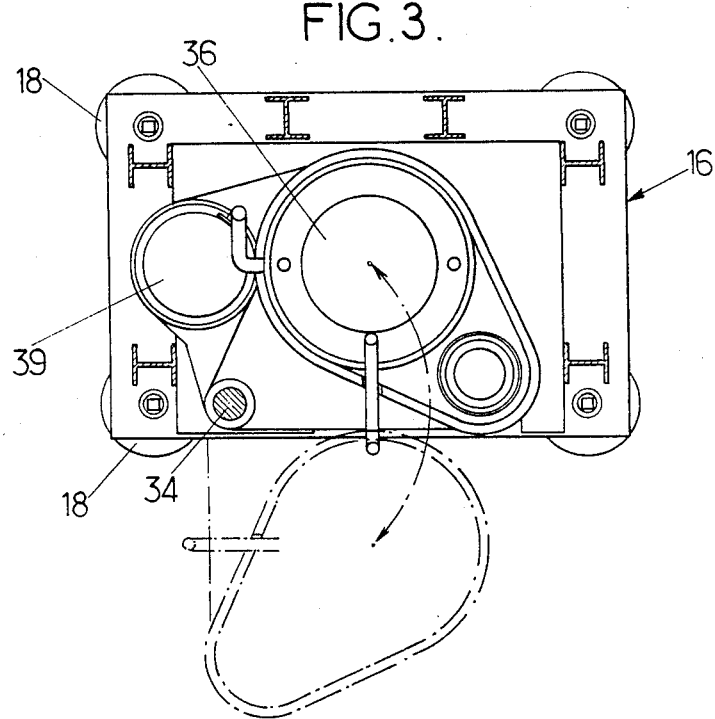

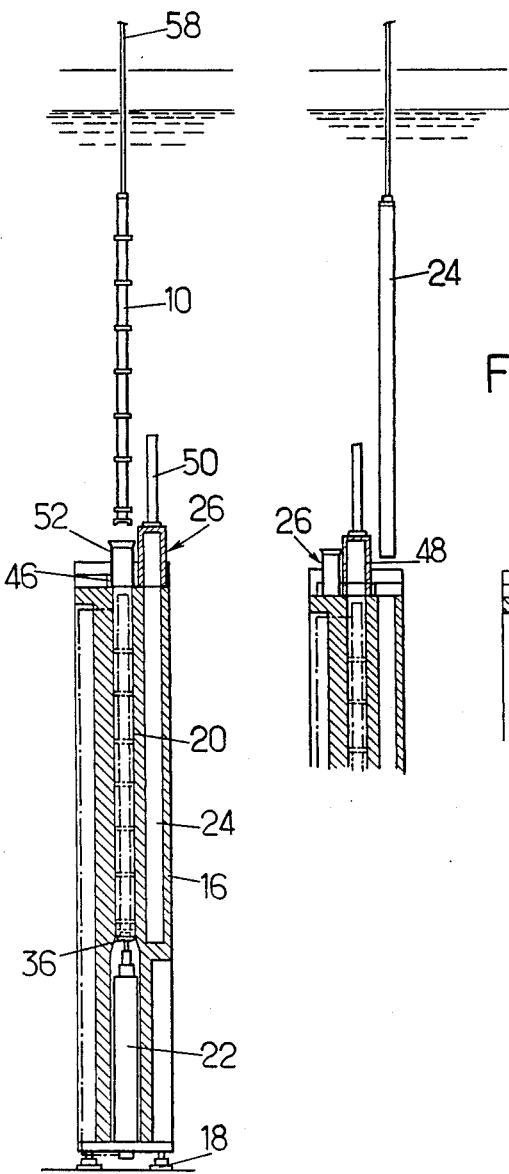
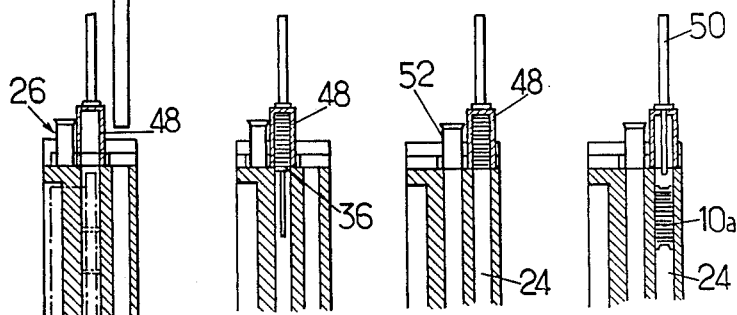
FIG.4A. FIG.4B. FIG.4C. FIG.4D. FIG.4E.

NUCLEAR FUEL ASSEMBLY STRUCTURE COMPACTING DEVICE

BACKGROUND OF THE INVENTION

1. Technical Field

The invention relates generally to the reduction of the volume occupied by the components of nuclear fuel assemblies exhausted due to their use in a reactor, for storing same.

Such assemblies generally comprise a bundle of fuel rods and a structure formed of two end pieces connected together by guide tubes and grids spaced apart along the guide tubes and defining rod-retaining pockets.

2. Prior Art

An apparatus has already been proposed in French Pat. No. 2,586,854 for dismantling a fuel assembly by cutting the guide tubes below one of the end pieces, then removing the fuel rods and reducing the volume occupied by the latter by grouping them together in a "bunch" of tightly packed rods.

It is also desirable to reduce the volume occupied by the structure for storing the latter during the required deactivation time.

For that, devices are known for laterally crushing the structure.

A compacting device is also known for use in a dismantling installation, having a compacting chamber whose cross-section is proportioned to that of the assembly, placed vertically, and which is provided with means for introducing the structure and with a jack for longitudinally compacting the structure against a movable member closing one end of the chamber.

The chamber of the device of this type described in French Pat. No. 2,538,939 is provided for receiving and compacting successive sections of the structure, obtained by severing the guide tubes. Each section is crushed in turn against the movable member consisting of a metal slide forming the bottom wall of the compacting chamber. The slide is withdrawn once several sections have been crushed against each other by the jack and the thus compacted structure is collected in a storage container.

That device has drawbacks. Compacting the structure requires numerous successive operations (positioning of the structure, severing it to form a first section, compacting the section, severing and compacting subsequent sections, collection of the compacted structure). The procedure is time consuming. The operations are complex, since the sections other than the first one must be compacted on the section or sections already crushed. Remote control of the device, placed in a water filled pool, is complex. Cutting into sections creates considerable fragments and debris.

There is also known (French Pat. No. 2,600,202) a device for consolidating the fuel rods of an assembly into a bunch for forcing them out of the structure.

SUMMARY OF THE INVENTION

It is an object of the invention to provide a compacting device of the above-defined type having a simple construction, making it possible to compact the structure in a minimum number of operations so as to reduce the time required and increase the efficiency.

For this, the invention provides a device in which the compacting chamber has a sufficient length to receive a non-fractionated assembly, is provided with a compacting jack at one end and is provided at the other end thereof with a unit movable transversely to the chamber between a position for introducing a structure and a position in which a reception box, forming the movable closure member, is aligned with the chamber.

The unit is movable to a position where the box is aligned with a storage container and the bottom wall of the box carries a jack for ejecting the compressed structure into the storage container. The position of the unit in which it is possible to eject the structure may be the same which allows a new structure to be introduced into the compacting chamber; that arrangement allows simultaneous ejection of the crushed structure and introduction of a new structure to be compacted.

The invention will be better understood from the following description of a particular embodiment, given by way of non-limitative example. The description refers to the accompanying drawings.

BRIEF DESCRIPTION OF THE DRAWING

FIGS. 2 and 3 show the device of FIG. 1, respectively as seen from above and in cross-section through line III—III;

FIGS. 4A to AE are schematical sectional views through a vertical plane showing the successive positions taken by the components of the device of FIG. 1 during operation thereof.

DETAILED DESCRIPTION OF A PREFERRED EMBODIMENT

Figure 1:
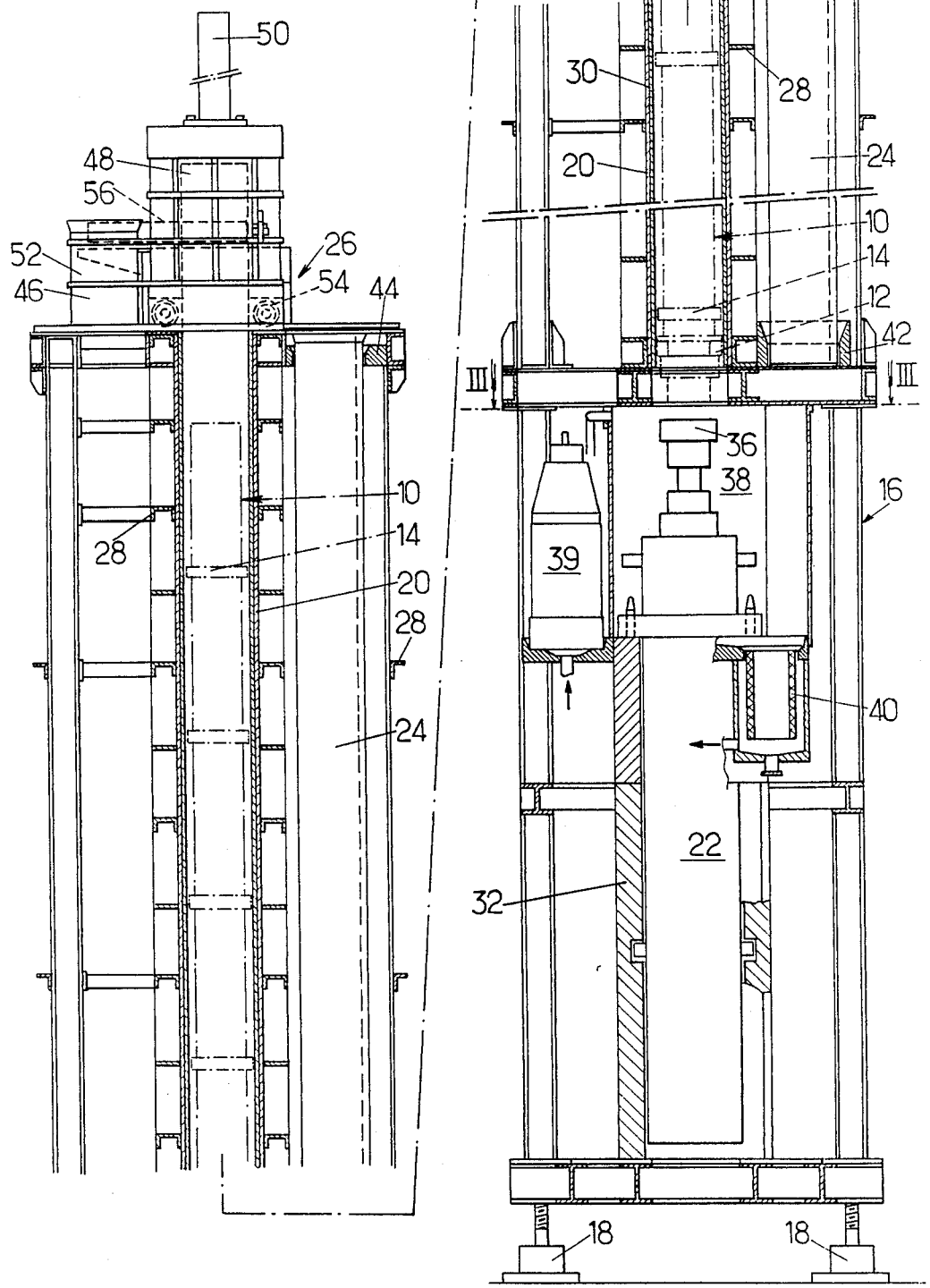
FIG. 1 is an elevational view in partial cross-section of a device whose unit is shown in the position in which the chamber and the compacting jack are aligned.

The device which will be described by way of example is for compacting structures or skeletons 10 of pressurized water reactor assemblies devoid of one of their end pieces and consequently consisting of an end piece 12, guide tubes and grids 14. The guide tubes are generally formed from a zirconium base alloy, as well as the grids, except for the grid closest to the remaining end piece, often made from a resistant alloy such as "INCONEL".

The compacting device is adapted to be placed on the bottom of a deactivation pool or of a loading pit of a nuclear power station. Referring to FIGS. 1 to 3, the device may be regarded as comprising a frame 16 made from stainless steel structural sections, having adjustable feet 18 bearing on the bottom of the pool. To the frame are rigidly fixed a compacting chamber 20, a hydraulic compacting jack 22, the components of a filtration installation and means for receiving a storage container 24. A movable unit 26 may be moved horizontally on rails provided at the upper part of the frame. These different components will be described successively.

The compacting chamber 20 is formed as a tube of square cross-section made from stainless steel having a length slightly greater than that of the structure 10 to be compacted. The tube is reinforced by spacers 28 distributed over the whole length thereof so that the tube can withstand the forces transmitted by the structure during compacting, under a longitudinal force of about 30 000 DaN. For avoiding scoring of the wall of the tube during compacting, it may be internally lined with a layer 30, generally 5 to 15 mm thick, of a material with a hardness greater than that of the elements of the structure. When one or more of the elements of the structure are made of a hard iron-chromium-nickel alloy, for example of "INCONEL", rather than of zirconium base alloy; a layer 30 of "INCONEL 718" of great hardness may be used.

The inner dimensions of chamber 20 must be such that the grids 14 are guided during compression: as will be seen later, compacting is stopped at a point such that the grids only undergo minor deformation, whereas the guide tubes are bent concertina fashion. The length of the structure may decrease from about 3.70–4.50 m to 500–600 mm during compacting.

The compacting jack 22 is placed under the compacting chamber 20 and it is aligned therewith. To make removal and maintenance of jack 22 possible, it is not fixed directly to frame 16 but is placed in a casing 32 which may rotate about a vertical pin 34 fixed to the frame (FIG. 3). The jack may thus be brought into the position in which it is shown schematically with dash-dot lines in FIG. 3, for removal. The piston of the jack carries a rammer 36 adapted for bearing against the lower end piece of the structure to be compacted.

The filtration installation for retaining fragments detached during compacting operates in closed circuit. It comprises a pump 39 with a water suction duct in the compartment of filter 40 formed below the compacting chamber 20, about the rod of the compacting jack 22. The filtered water is forced into the upper part of compartment 38. The fragments detached during compacting remain in filter 40 where they will be recovered. The water contained in the compacting chamber 20 provides lubrication during compression of the structure or skeleton 10.

The means for receiving the storage container 24 comprise, in the embodiment shown in FIGS. 1 and 2, a lower base 42 and a guide 44. The receiving means are engaged for receiving a container 24 having a square internal cross-section slightly greater than that of the compacting chamber 20, so as to avoid difficulties when introducing the compacted structures whose grids might be deformed. Container 24 is made from stainless steel, of small thickness since it does not have to withstand stresses. It has advantageously the same length as the compacting chamber and it is placed at the side thereof: due to the reduction in longitudinal size of a structure during compacting, each container 24 is generally adapted for receiving six to ten structures. Its length will typically be comprised between 1/6 and 1/10 of the length of the compacting chamber.

The movable unit 26 may be regarded as comprising a slide 46 of sufficient rigidity for withstanding the compression forces. A reception box 48 whose two ends are open is fixed to the slide. Box 48, whose length is greater than that of the compacted structure, may have a construction similar to that of the compacting chamber 20. It is closed at the top by the piston of a hydraulic ejection jack 50 whose body is fixed to the slide 46.

Slide 46 further carries means for guiding a structure for facilitating downward movement of the structure into the compacting chamber 20. The guiding means shown in FIGS. 1 and 2 are formed by a vertical sheath 52, parallel to box 48. The distance between the axes of sheath 52 and box 48 is equal to the distance between the axes of the compacting chamber 20 and container 24. Thus, when the carriage provided with wheels 54 travelling over rails belonging to the frame, is moved rightwards from the position shown in FIG. 4, up to the position in which sheath 52 is aligned with the compacting chamber 20, box 48 is aligned with the container 24.

The movement of the carriage between these two work positions is for example controlled by jacks 56.

The operating sequence of the device which has just been described may be as shown schematically in FIGS. 4A to 4E.

A structure 10 to be compacted is brought above the compacting chamber 22 by means of a handling tool 58, comprising for example a set of three plates which may be engaged on the upper ends of the guide tubes and moved horizontally with respect to each other so as to grip them. With the movable unit 26 in the position shown in FIG. 4A, the structure 10 is lowered as far as the position shown with dash-dot lines where it bears against the rammer 36 of the compacting jack 22.

The movable unit 26 is then moved so as to bring the reception box 48 opposite the compacting chamber 20. In this position, a storage container 24 may be lowered into the frame (FIG. 4B).

The compacting jack 22 is actuated and drives the whole of the structure into the reception box 48, of appropriate length (FIG. 4C). The piston of the jack is retracted and the reception box is brought opposite the container 24 (FIG. 4E). The ejection jack 50 is actuated and drives the compacted structure 10a into the container 24 (FIG. 4A). The sequence is repeated for six to ten structures. Every time, jack 50 drives the compacted structure while pushing back the compacted structures already in position towards the bottom of container 24 if necessary. Then the storage container 24 is removed which is replaced by an empty container.

It can thus be seen that the operation for axially compacting a structure takes place in a single direction, whence a saving of time. With the storage container placed beside the compacting chamber, the handling operations are reduced to a minimum. The mechanisms required are reduced to the compacting jack 22, the ejection jack 50 and the jacks 56 for moving the movable unit. The apparatus required for introducing the structure into the compacting chamber and for bringing and removing the storage container may be those in any case required for operation of the power station. The device as a whole may be readily moved from one site to another.

We claim:

1. Device for compacting a structure of a nuclear fuel assembly devoid of fuel rods, comprising:
    a vertically elongated compacting chamber having a vertical axis, whose cross-section is dimensioned to that of a structure to be compacted and which is of sufficient length to receive said structure, in non-fractionated condition;
    a compacting jack located at an end of said compacting chamber for axially forcing the structure toward the other end of the chamber and crushing said structure;
    a movable unit confronting said other end of the compacting chamber, having a structure reception box and movable transversely to the axis of the chamber between a position for axial introduction of the structure to be compacted into said compacting chamber through said unit and a position in which said reception box forming an abutment member is aligned with the compacting chamber and forms an abutment for the compacted structure; and
    an ejection jack carried by said movable unit, arranged to force the structure in crushed condition out of said reception box when energized.

2. Device according to claim wherein the movable unit is movable into a position in which the reception box is aligned with a permanent storage container for axial ejection of the structure.

3. Device according to claim 2, comprising means for receiving the storage container in a position where the structure reception box is aligned with the storage container, said movable unit being so dimensioned that means thereof for guiding the structure into compacting chamber are aligned with the compacting chamber.

4. Device according to claim 2, wherein the permanent storage container has a cross-section greater than that of the compacting chamber and has substantially the same length and means are provided for maintaining the storage container parallel to the compacting chamber and adjacent thereof.

5. Device according to claim wherein said compacting chamber is internally coated with a layer of a material harder than that of the structure.

6. Device according claim 1, further comprising a frame to which the compacting chamber is rigidly fixed and including horizontal rails for travel of the movable unit located above the compacting chamber.

7. Device according to claim 1, further comprising a frame on which the compacting jack is removably mounted below the chamber.

8. Device according to claim 7, further comprising a casing for receiving the compacting jack, said casing being mounted on the frame for rotation about a vertical axis between a position in which the compacting jack is aligned with the compacting chamber and a position in which the jack is clear from the frame.

9. Device according to claim 1, further comprising a filtering installation having a pump connected to draw water from a compartment communicating with the compacting chamber, through a filter, and to deliver filtered water to an upper part of said compartment.

* * * * *

UNITED STATES PATENT AND TRADEMARK OFFICE
CERTIFICATE OF CORRECTION

PATENT NO. : 4,944,911

DATED : July 31, 1990

INVENTOR(S) : Beneck et al

It is certified that error appears in the above-identified patent and that said Letters Patent is hereby corrected as shown below:

On the title page item [75] Inventors: the second named inventor should be --Claude Quayre--.

Column 5, line 1: Claim 2 is dependent on --claim 1,--.

Column 5, line 9: "the" is missing in claim 3, line 5, after "into".

Signed and Sealed this

Seventh Day of April, 1992

Attest:

HARRY F. MANBECK, JR.

*Attesting Officer*　　　　　　　　　*Commissioner of Patents and Trademarks*